June 24, 1969

C. DAVIS 3,451,553

SEPTIC TANK STRUCTURE

Filed Feb. 29, 1968

INVENTOR.
CLOYD DAVIS

BY

ATTORNEY

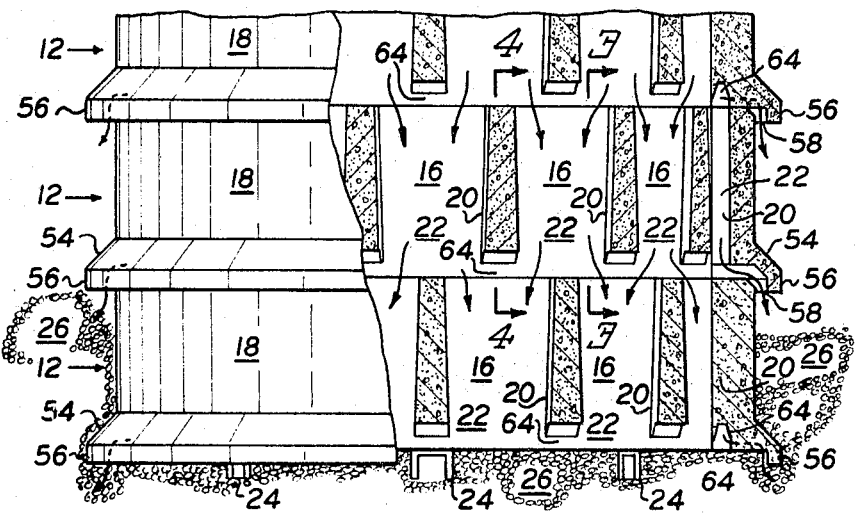
Fig. 2
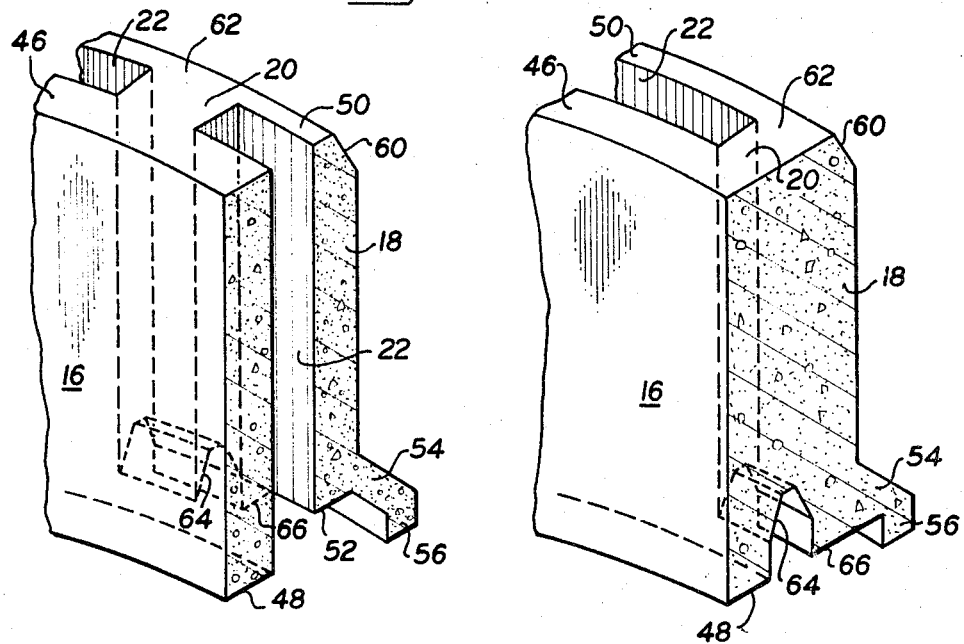
Fig. 3
Fig. 4
INVENTOR.
CLOYD DAVIS
BY
ATTORNEY

United States Patent Office 3,451,553
Patented June 24, 1969

3,451,553
SEPTIC TANK STRUCTURE
Cloyd Davis, Williston Park, N.Y., assignor to Modern Sewerage Systems, Inc., Roslyn, N.Y., a corporation of New York
Filed Feb. 29, 1968, Ser. No. 709,416
Int. Cl. B01d 23/16, 23/10
U.S. Cl. 210—170                        7 Claims

ABSTRACT OF THE DISCLOSURE

A septic tank having a plurality of precast circular tiers forming a tank chamber and a plurality of peripheral chambers opens to the ground through which liquid is leached into the ground.

---

The present invention relates to apparatus for the underground treatment and disposal of sewage and, in particular, to a combined septic tank and leaching well for accomplishing such treatment.

In U.S. Patent 3,057,796, there is disclosed a combined septic tank and leaching well in which the decomposition and treatment of sewage is efficiently effected and wherein the clarified liquid is released into the ground without clogging of the surrounding subsoil. Many devices constructed in accordance with the teachings of this patent have been installed and are satisfactorily and efficiently performing their intended functions.

It is, however, an object of the present invention to provide novel improvements to the devices disclosed by the aforementioned patent which render such improved devices more efficient and of longer life.

It is another object of the present invention to provide a septic tank and leaching well construction which is simpler and cheaper to fabricate and easier and more economical to assemble and install under field conditions.

It will be appreciated that devices of this type are employed mainly in suburban and rural communities which do not have public sewage disposal systems. Such devices are buried within the subsoil adjacent to living or working quarters and therefore for the sake of continued health must be as highly efficient and as effective as possible. Furthermore, because they are buried in the ground and are relatively large devices, they are intended to be installed only once and they must therefore function effectively for many years. Still further, such devices are, because of their size, relatively expensive both to fabricate and install.

Accordingly, the objects here enumerated are most important and represent the most critical features of such devices.

There are, of course, other advantages to the present invention. Such advantages and objects, together with the aforementioned, will become apparent from the following description in which reference is made to the accompanying figures, in which:

FIG. 2 is a fragmentary view of the lower tiers including cutout section views showing the construction of the tier sections;

FIG. 3 is an enlarged view of a portion of FIG. 2 taken along line 3—3 and,

FIG. 4 is an enlarged view of a portion of FIG. 2 taken along line 4—4.

Figure 1:
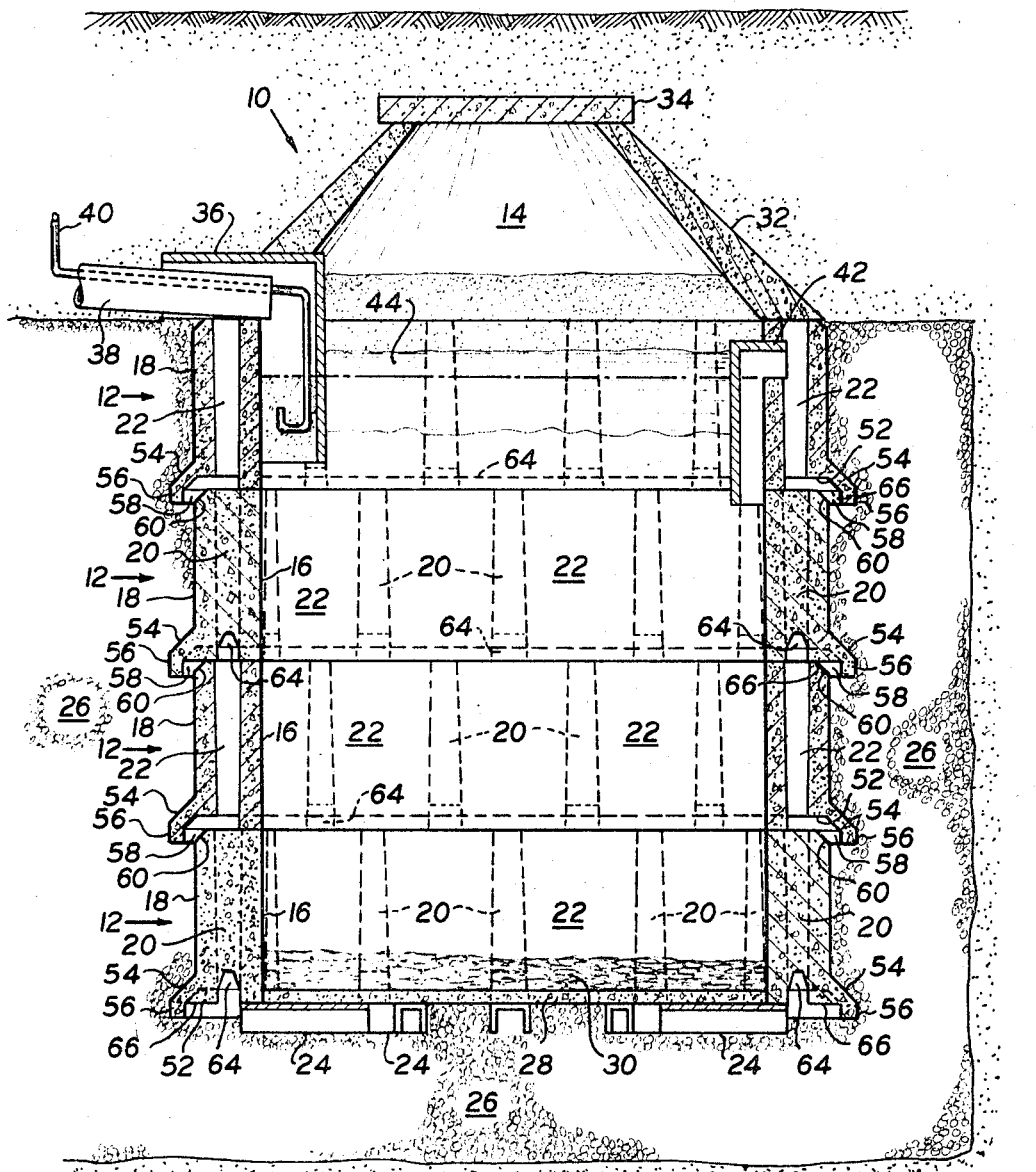
FIG. 1 is a vertical elevational cross sectional view of a complete combined septic tank and leaching well made in accordance with the present invention showing its tiered construction.

Turning now to FIG. 1, the device comprises a tank assemblage 10, comprising a plurality of preformed circular members or tiers 12 stacked one atop another, forming an inner tank chamber 14. Each of the tiers 12 comprises an inner band 16, a concentric outer band 18 spaced therefrom and connected to the inner band by a plurality of evenly spaced vertical ribs 20. The space between the bands 16 and 18 and the ribs 20 define dispersive chambers 22 peripherally surrounding the tank 14 through which relatively clarified liquids flow downwardly and outwardly into the surrounding gravel bed through a plurality of openings in the circumference of the outer band 18. The adjacent tiers are rotatively offset from each other so that each dispersive chamber 22 communicates with two similar chamber 22 in each adjacent lower tier.

The lowermost tier has its innermost band 16 resting upon a plurality of U-shaped drainage channel members 24 radially disposed and embedded in a gravel floor 26. Resting upon the channel supports 24 within the lower tier 12 is a concrete slab 28 having a diameter equal to the inner diameter of the band 16 sealing the bottom of the tank 10 and creating a support on which sediment and solids 30 may fall. The topmost tier is provided with a truncated conical cover member 32 having a cap 34 resting thereon, sealing the inner chamber 14 of the tank 10. The hole is then filled in and surrounded by a substantial amount of gravel 26 and completely buried into the ground.

An inlet member 36 formed of an angular stock of U-shaped channel, resting on the upper lip of the upper tier 12, is provided to permit entry of sewage and air into the inner chamber 14. Sewage enters through a waste pipe 38 while air is supplied into the device through conduit 40, The air inlet is provided in conjunction with the sewage inlet to create, initially, an aerobic decomposition of the sewage as explained in the aforementioned patent.

An outlet member 42 also formed of an angular U-shaped member resting upon the upper lip of the upper tier diametrically opposed to the inlet 36 is provided to permit exiting of substantially clarified liquid from the chamber 14 to the dispersive chambers 22. The lower end of the outlet member 42 extends below the lower level of the upper tier so that liquid enters into the outlet from a substantial distance below the upper level of the tank. It is further noted that both inlet and outlet members are U-shaped channel members which abut the side of the inner band 16 creating a closed conduit. Hollow pipe members, rather than U-shaped channels may also be employed.

As explained in the aforementioned patent, the inner chamber 14 is adapted to receive therein a quantity of sewage in the form of solids suspended within a liquid carrier. Soon after the device is placed in service, the level of sewage rises to that of the inlet and outlet openings and is divided by gravitational action and the characteristics of sewage into a layer or zone of grease and oils 44 on the upper surface within which is captured a quantity of bacteria, below which is a deep layer of substantially clarified waste liquid in which might be found freely floating waste and falling solid wastes, and at the bottom, supported by slab 28, a layer of solid material 30.

The aerobic, anaerobic and other treatment of the sewage in the present device is essentially the same as the treatment process described in the aforementioned patent and its description here is believed unnecessary. It will be understood, of course, that the description contained in U.S. 3,057,796 is incorporated here as if fully set forth.

The advantages of the present invention are found within the novel form and construction of the tier members 12, which are shown in detail in FIGS. 2-4. As noted, each tier 12 comprises a pair of spaced concentric bands 16 and 18 that are selected so as to create chambers 22 of sufficient size for the purpose intended and to enable creation of a tank without the use of too many tiers.

The inner band member 16 is greater in vertical dimension and is formed with a smooth uniform upper edge face 46 and a similarly formed lower edge face 48 so that when one tier is stacked upon the other, the lower edge face 48 of an upper tier will mate and rest squarely upon the upper edge face 46 of the next lower tier. Because of the smoothness of these edge faces and uniform contact, no mortar, cement or adhesive is required to join the tier, although the same may be applied if desired.

The outer band 18 is also made with a smooth uniform upper edge face 50 and lower edge face 52 formed as a lateral extension of a respective chamber; however, its height is somewhat less than that of the inner band 16 so that its lower edge face 52 terminates spaced upward from the plane of lower edge 48 and does not abut the upper edge face 50 of the next lower tier when stacked, thereby forming a laterally extending circumferential opening at the periphery of each of the respective chambers 22.

The outer band 18 is further provided with a peripheral lip having an angular extending laterally outward portion 54 terminating in a vertically downward extending portion 56, spaced from the outer wall of band 18 so as to create an exhaust channel or port 58 therebetween leading from each of the chambers 22 as seen in FIG. 1. To enlarge the area of exhaust port 58, the outer upper corner 60 of band 18 of the next lower tier 12 is circumferentially beveled.

The vertical ribs 20 are designed both as a partition between chambers 22 and as additional support for band members 16 and 18. Accordingly, the ribs 20 extend from an upper end 62 which is coplanar with the end faces 46 and 50 to an end 64 somewhat short of the lower end face 48 of inner band 16. This end 64 of the rib 20 is shown shaped in a triangular arch forming a conduit passage between adjacent chambers 22 of the same tier, thus affording a communicating passage between the chambers 22 about the lower portion of each tier 12 thereby enabling fluid flow as per the arrows indicated in FIG. 2. For the purpose of assisting the support of the stacked tiers, the vertical rib 20 is laterally extended in the direction of the outer band 18 and is provided with a footing 66 integral with the outwardly sloping portion 54. This footing 66 is coplanar with the edge face 48 of the inner band 16 and is therefore capable of resting upon the upper edge face 50 and the outer band 18 of the tier below it in the same manner as the face 48 rests upon the upper face 46 of the tier below.

One of the distinctions of the present device over that of the aforementioned patent lies in the fact that each of the exhaust ports 58, forming enlarged outlets for their respective dispersive chambers 22 to the surrounding earth, and through which substantially clarified liquid leaches outwardly, is now to be found at the lower edge of the tier. In the aforementioned patent, the leaching ports, there indicated by the numeral 24 were to be found along the upper edge of each tier. By the present construction, advantage is taken of the hydrostatic head or pressure created by the column of liquid contained in each of the chambers 22. The liquid waste is thus pressurized and caused to escape more readily into the surrounding gravel bed 26 and as a result, drainage is no longer dependent upon gravity or overflow of fluid within the chambers.

A further advantage of the present construction lies in the lip portions 54 and 56 which, as will be seen in FIG. 1, overlie the exhaust ports 58 forming extensions of the chambers 22. The lip portions sufficiently cover laterally and vertically downward over the ports 58 to prevent backwash of excess liquid in the surrounding soil back into the ports and chambers, caused by perhaps a sudden heavy rainfall or a failure of drainage through the gravel. Coupled with the increased hydrostatic head in each of the chambers 22, the lip construction effectively enlarges the exhaust areas of the chambers 22, maintains consistent leaching outwardly of the tank and prevents clogging of exit ports 58 by backwashed sewage, debris, stones, etc. Consequently, with the present construction, the exit ports 58 may be made considerably larger in cross section, enabling faster leaching, than in previously known devices.

It will now be seen why the present construction does not require the use of mortar or adhesive. Since the exit ports are at the bottom of chamber 22, along the line of partition between tiers, the two are coextensive and leakage between tiers, at a point remote from the exhaust of the dispersive chamber, is no longer of major consequence.

The bottommost section has all of its exhaust ports 58 exposed to the soil for drainage. The provision of the exhaust ports at the base of the circulating chamber results in increasing the exhaust facilities to deal with the drainage of fluid from portions of the tank which would normally be filled with solid wastes. This larger opening is also immediately affected by the hydrostatic head of pressure exerted in the circulating chambers in communication with it and above it and thus produces a larger effective rate of drainage.

The present device is further distinguished from the prior devices, in that, the connecting ports between adjacent dispersive chambers previously located midway within the vertical support rib (see numeral 45 in the aforementioned patent) have been eliminated and replaced with the arched through-passage 64. The placement of the passage 64 enables the fluid flow between adjacent chambers 22 to be more responsive to the hydrostatic head created in the chamber and therefore a great deal more effective dispersive flow is obtained. By the present device, fluid no longer has to rise to the communicating passageway and therefore there is provided a complete and continuous passageway in horizontal alignment with the exhaust openings so that the hydrostatic pressure is most effective to distribute the fluid under uniform pressure at the exhaust opening, thereby increasing further the rate of drainage.

It will now be seen that the present invention provides an improved drainage system capable of more rapid drainage rates, less liable to clogging and more efficient as a sewage separation and treatment device. It will further be seen that the present invention provides a simple and more inexpensive septic tank construction, easier to fabricate and install.

The elimination of the midway passage ports enables the present device to be fabricated more easily and less expensively than that of the aforementioned patent. The construction of this device does not require complex molds employing sand molds or other die parts or molding parts. It will be obvious that simple molding die parts may be employed resulting in a less expensive product.

It will be understood that the present device is preferably constructed by precasting each tier as a single integral concrete unit. Of course, each tier may be fabricated out of steel or plastic in individual brick-like elements or a plurality of molded parts. Other modifications may be employed. For example, the shape of the exhaust ports and covering lips may be changed as desired as may the arched passageways between chambers.

Additionally, it is clear that not all of the circular members or tiers need be constructed in accordance with this invention. In a tank employing many tiers one or two intermediate tiers may be in accordance with the aforementioned patent for variety and for use of existing materials. Accordingly, existing septic tanks may be partially rebuilt or repaired by replacing certain tiers with those in accordance with this invention.

I claim:

1. Apparatus for the underground treatment and disposal of sewage comprising,
a tank formed of a plurality of vertically stacked circular members at least one of said members formed of a pair of spaced concentric bands connected by a plurality of circumferentially spaced vertical ribs defining spaced peripheral chambers within and surrounding said tank, the outer band of each circular member being provided with a plurality of openings positioned circumferentially along its lower edge forming a hydrostatic exhaust port at the lower edge of each of said chambers, inlet means for feeding sewage within said tank and exit means for delivering fluid from within said tank to the uppermost of said circular members, whereby said fluid is dispersed throughout each of said peripheral chambers and outwardly thereof under hydrostatic pressure through said exhaust ports, and an endless flared lip extending circumferentially about said outer band and laterally outward and vertically downward therefrom, said lip defining a circumferential fluid connection between said exhaust ports, the lateral outward extent of said lip effectively enlarging said exhaust ports, and the vertical downward extent terminating in a plane below said lower edge of each of said chambers.

2. Apparatus according to claim 1 wherein, the inner band is provided with smooth uniform planar upper and lower edges adapted for mating contact when the circular members are stacked one upon the other, and wherein the outer band is provided with an upper edge coplanar with the upper edge of said inner band and extends substantially parallel to and terminating in a lower edge spaced laterally from the plane of the lower edge of said inner band thereby defining a part of the circumferential opening for the peripheral chambers.

3. The apparatus according to claim 2 wherein, said vertical ribs extend from the plane of the upper edges of the inner and outer bands to the plane of the lower edge of said inner band, thereby being adapted to mate and rest on the upper edge of the outer band when the circular members are stacked.

4. The apparatus according to claim 3 wherein, said ribs are cut out along their lower edges to provide a communicating passage between adjacent peripheral chambers.

5. The apparatus according to claim 1 wherein, the outer corner of the upper edge of said outer band is beveled to a plane substantially parallel to the angle of the flared lip portion.

6. In a septic tank structure, a plurality of tier members having a hollow interior body to enclose sewage wastes, a plurality of fluid chambers disposed peripherally about said body interiorly thereof, each chamber having an opening at the top and bottom of said body, ribs spacing each of said chambers from the other at their tops and for a substantial portion of the height of the body of said tier member, a passageway defined in each spacing rib to provide a through communication between said chambers at the bottom of said body, and an exhaust port at the bottom of each chamber to enable the exhaust of fluid from each of said chambers and outward from each said tier member under the pressure of the head of the fluid in said chambers above, circumferential covering means over said exhaust ports extending outward from the body of said tier members and downward in covering relation to said exhaust ports to prevent the entry of material surrounding said tier members from movement into said fluid chambers through said exhaust ports, said covering means extending said exhaust ports outward beyond the bodies of said tier members and connecting said exhaust ports circumferentially in fluid communication with each other.

7. In a septic tank structure having a plurality of tier members as in claim 6, said tier members each being stacked one upon the other with the fluid chambers of the upper tier member being positioned above a spacing rib of the next lower tier member and being in direct fluid communication with a plurality of fluid chambers of the next lower tier member, said passageway of the upper tier member providing fluid communication between each chamber of the upper tier member with each chamber of the lower tier member to add the full pressure of the head of the fluid in the chambers of the upper tier member to the full pressure of the head of fluid in the chambers of the lower tier member.

References Cited

UNITED STATES PATENTS

| | | | |
|---|---|---|---|
| 2,069,058 | 1/1937 | Davis | 210—532 X |
| 3,057,796 | 10/1962 | Davis | 210—532 X |

REUBEN FRIEDMAN, *Primary Examiner.*

J. L. DE CESARE, *Assistant Examiner.*

U.S. Cl. X.R.

210—207, 532